Dec. 8, 1942.  W. E. LAWSON, SR  2,304,415
TOY BANK
Filed Feb. 12, 1942
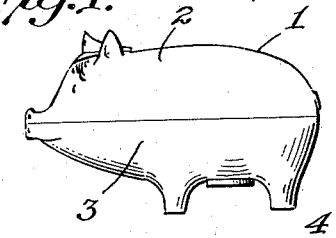
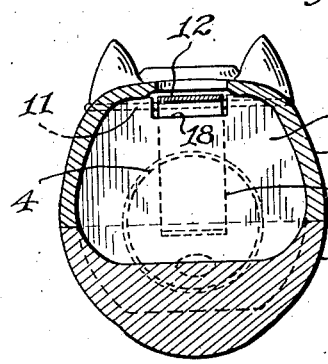
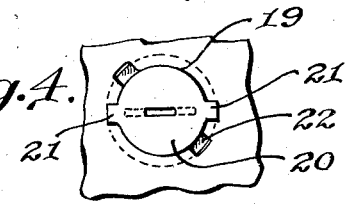
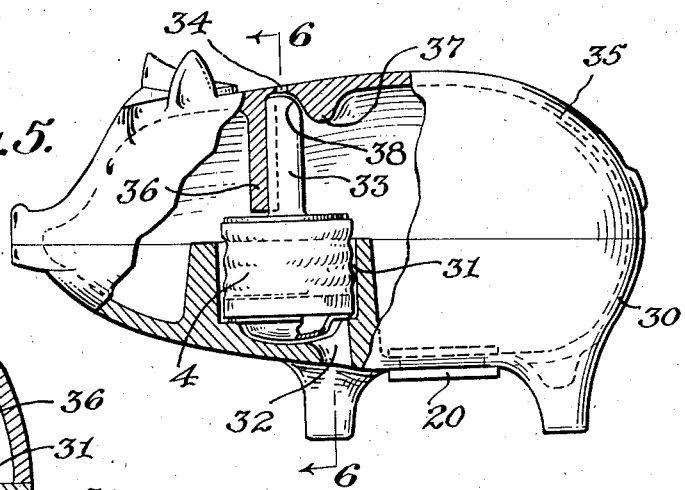
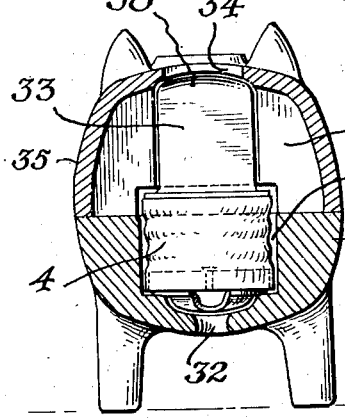
Inventor
William E. Lawson, Sr.
By Eccleston + Eccleston,
Attorneys Patented Dec. 8, 1942

2,304,415

UNITED STATES PATENT OFFICE 2,304,415

TOY BANK

William E. Lawson, Sr., Rahway, N. J., assignor to Otis-Lawson Company, New York, N. Y., a partnership composed of Jack Otis, and William E. Lawson, Sr.

Application February 12, 1942, Serial No. 430,672

19 Claims. (Cl. 46—3)

This invention relates to toy banks and has for its primary object to provide a bank of attractive appearance and in simulation of an animal, such as a pig, which will emit a sound in simulation of that animal, at each insertion of a coin.

A further object of the invention consists in providing novel and simplified mechanisms for operating the sound producing device upon the deposit of each coin into the bank.

Another object of the invention resides in the provision of a bank having the foregoing characteristics, and which may be easily and inexpensively manufactured.

Other objects and advantages of the invention will be apparent from the following description when taken in connection with the accompanying drawing in which, Figure 1 is a perspective view of the bank on a reduced scale.

Figure 2 is a longitudinal vertical sectional view of the bank.

Figure 3 is a transverse sectional view taken on line 3—3 of Figure 2.

Figure 4 is a fragmentary plan view of the discharge means for the bank, looking in the direction of the arrows 4—4 of Figure 2.

Figure 5 is a side elevational view of a modified form of the bank, parts being broken away to indicate the interior construction; and, Figure 6 is a transverse sectional view taken on line 6—6 of Figure 5.

Referring to the drawing more specifically, and particularly to Figures 1 to 4, inclusive, the numeral 1 indicates the hollow body of the toy bank which is here shown in the form of a pig, and formed of upper and lower longitudinal sections as indicated by numerals 2 and 3. These sections may be formed of papier-mâché, or any other preferred moldable material, and the sections may be adhesively secured together after the interior elements have been properly installed as hereinafter indicated.

The sections 2 and 3 are molded into forms to present the appearance of a pig or similar animal, and in the forward portions of these sections complementary semicylindrical cavities are formed to receive a sound emitting device or "squealer" 4. This device is of more or less conventional construction comprising a bellows 5, spring 6, reed 7, and aperture 8 for the emission of the sound vibrations. The lower section 3 is also provided with an aperture 9 adjacent the forward end of the "squealer" and substantially in line with the aperture 8, so as to permit ready access of the sound waves to the exterior of the bank.

In the form of the invention illustrated in Figures 1 to 4, inclusive, the sound emitting device may be operated by a lever, and to this end a lever is pivotally mounted adjacent the top of section 2 and in close proximity to the squealer 4. The lever is indicated by the numeral 10 and its pivot by the numeral 11. Extending at substantially a right angle to lever 10 and integrally connected thereto is an arm 12, forming in effect a bell-crank lever. The arm 12 extends across a coin slot 13 in section 2, and the lower end of lever 10 is rounded slightly, as indicated at 14, and is loosely held against element 4 by the weight of arm 12. It will be obvious of course that the insertion of a coin in slot 13 will depress the arm 12 and thus swing the lever 10 to the left (Figure 2) thereby actuating the squealer. The coin will thus be deposited in the bank, and the spring 6 will return the squealer to its normal position with the arm 12 again extending across the slot 13.

An enlargement 15 formed in the lower section 3 is provided with a transverse slot 16 for the reception of a partition 17, of heavy cardboard or like material. This partition provides an isolated compartment for the coins and thus prevents interference with the squealer mechanism. The upper end of the partition 17 is preferably provided with a slot 18 which serves not only as a guide for arm 12 but also acts to prevent undue strain being placed upon the pivot 11 of lever 10 when coins are being inserted in the bank.

The lower section 3 of the bank is provided with a discharge outlet 19 for use in emptying the bank when desired, and is normally closed by a cover 20. The closure is here shown as provided with lugs 21 adapted to co-act in the usual manner with slots 22 formed at the edge of the opening 19. The exterior of the closure 20 is preferably provided with an arcuate notch 23 adapted to receive an edge of a coin for rotating the closure to either open or close the same.

It will be understood of course that in constructing the bank, the elements 4 and 17 are installed in the lower section 3, the elements 10 and 11 in the upper section 2, and that the two sections are then united in the manner heretofore described.

The exterior of the modified toy bank shown in Figures 5 and 6 is substantially the same as that previously described, but the interior construction and the manner of actuating the squealer are somewhat different.

In this second form of the invention, the lower section 30 of the bank is provided with a circular cavity 31 for the reception of the sound emitting device 4, and with a downwardly-opening passage 32 for the transmission of the sound waves. Mounted upon or formed on the upper end of member 4 is a rigid post or arm 33 which extends upwardly to a position just below the coin slot 34 formed in upper section 35. This upper part of the bank is preferably formed with an integral downwardly-extending partition 36 which serves as a guide and brace for the arm 33. Deflection of the arm 33 in the opposite direction is prevented by a protuberance 37.

The upper end of the arm 33 is rounded or cam-shaped on one side as indicated at 38 in Figure 5, for cooperation with the edge of each coin inserted in the slot 34. It will thus be apparent that the inserted coins produce a camming action on the arm 33 so as to depress the same and thereby actuate the sound emitting device 4, the coin thereafter being deposited in the coin compartment of the bank.

In assembling this modified construction of the toy bank the sound-emitting element 4 and its arm 33 are first installed in the lower section 30, and the upper section is then applied and united thereto in the manner noted in connection with the description of the first described form of the invention.

The toy bank disclosed herein is singularly attractive in design, construction and operation, in that it simulates an animal in both appearance and sound, is easily and inexpensively constructed yet strong and durable in operation, and is well adapted to stimulate savings by reason of the operation of the novel sound effect at each insertion of a coin.

In accordance with the patent statutes I have described what I now believe to be the preferred forms of the invention but inasmuch as various changes may be made in the details of construction without departing from the spirit of the invention it is intended that all such changes be included within the scope of the appended claims.

What I claim is:

1. A toy bank comprising a hollow body portion provided with a coin slot, a collapsible sound emitting device within the body portion, and means interposed between the sound emitting device and the coin slot and adjacent the latter for collapsing the sound emitting device by the outside pressure of a coin being inserted in the slot.

2. A toy bank comprising a hollow body portion provided with a coin slot, and a sound transmitting slot, a collapsible sound emitting device within the body portion and disposed adjacent said slots, and means interposed between the sound emitting device and the coin slot and adjacent the latter for collapsing the sound emitting device by the outside pressure of a coin being inserted in the slot.

3. A toy bank comprising a hollow body portion provided with a coin slot, a collapsible sound emitting device within the body portion, an arm associated with the sound emitting device and having one end disposed adjacent the coin slot, whereby the sound emitting device will be collapsed by the outside pressure of a coin being inserted into the slot.

4. A toy bank comprising a hollow body portion provided with a coin slot, a collapsible sound emitting device within the body portion, a cam rigidly secured to the sound emitting device and disposed in the path of a coin entering the slot, whereby the sound emitting device is actuated by a camming action as each coin enters the bank.

5. A toy bank comprising a hollow body portion provided with a coin slot, a collapsible sound emitting device within the body portion, an arm fixed on the sound emitting device and having its free end immediately adjacent the slot, the free end of the arm being rounded so as to produce a camming action in conjunction with a coin entering the slot to thereby actuate the sound emitting device.

6. A toy bank comprising a hollow body portion provided with a coin slot, a collapsible sound emitting device within the body portion, an arm fixed to the sound emitting device and having its free end immediately adjacent the slot, a partition against which the arm is slidably mounted, the free end of the arm being rounded so as to produce a camming action in conjunction with a coin entering the slot to thereby actuate the sound emitting device.

7. A toy bank comprising a hollow body portion provided with a coin slot, a sound emitting device within the body portion, a lever for actuating said sound emitting device, and coin controlled means for operating the lever.

8. A toy bank comprising a hollow body portion provided with a coin slot, a sound emitting device within the body portion, and a bell-crank lever having one arm in cooperative relation with the sound emitting device and the other arm in cooperative relation with a coin entering the coin slot.

9. A toy bank comprising a hollow body portion provided with a coin slot, a sound emitting device within the body portion, a lever pivoted adjacent the coin slot for actuating the sound emitting device, an arm extending laterally from the lever and disposed beneath the coin slot, and a vertical partition in the bank, said partition provided with a slot at its upper end to serve as a guide and brace for said arm.

10. A toy money bank comprising a hollow body in the form of a pig or the like, said body formed of upper and lower molded sections, the upper and lower sections being provided with complementary recesses to form a compartment for receiving a sound emitting device, and the lower section also provided with a transverse recess for supporting a partition in vertical position.

WILLIAM E. LAWSON, SR.